US005616911A

United States Patent [19]
Jagielinski

[11] Patent Number: 5,616,911
[45] Date of Patent: Apr. 1, 1997

[54] READ-ONLY MAGNETIC SECURITY PATTERN

[75] Inventor: Tomasz M. Jagielinski, Carlsbad, Calif.

[73] Assignee: Eastman Kodak Company, Rochester, N.Y.

[21] Appl. No.: 448,945

[22] Filed: May 24, 1995

[51] Int. Cl.$^6$ ........................................ G06K 19/06
[52] U.S. Cl. ................................ 235/493; 235/449
[58] Field of Search .............................. 235/449, 493

[56] References Cited

U.S. PATENT DOCUMENTS

| | | |
|---|---|---|
| 3,566,356 | 2/1971 | Holm et al. . |
| 3,790,754 | 2/1974 | Black et al. . |
| 4,124,735 | 11/1978 | O'Horo ............................ 428/406 |
| 4,182,481 | 1/1980 | Maussion . |
| 4,203,544 | 5/1980 | Guilgue . |
| 4,225,780 | 9/1980 | Jacoub et al. . |
| 4,237,189 | 12/1980 | Deffeyes . |
| 4,281,043 | 7/1981 | Deffeyes . |
| 4,855,584 | 8/1989 | Tomiyama et al. . |
| 4,863,196 | 9/1989 | Ohnishi et al. . |
| 4,982,076 | 1/1991 | Fujita . |
| 5,196,681 | 3/1993 | Mantegazza . |
| 5,418,458 | 5/1995 | Jeffers ............................ 324/235 |

*Primary Examiner*—Harold Pitts
*Attorney, Agent, or Firm*—William F. Noval

[57] ABSTRACT

A security device and system for encoding documents with code patterns, and particularly magnetic bar code patterns or other indicia exhibiting zero remanence. An in-field magnetoresistive (MR) sensing element read head is employed to magnetize the bar code pattern bands and detect their width or spacing apart as they are advanced with respect to the head. After read out, the bar code pattern bands exhibit practically no residual magnetic field and are not readable by a magnetic viewer. The code patterns may be in any shape or format for adding security to documents of all types.

24 Claims, 3 Drawing Sheets

READ-ONLY MAGNETIC SECURITY PATTERN

REFERENCE TO RELATED APPLICATION

Reference is hereby made to commonly assigned, copending U.S. patent application Ser. No. 330,887 filed Oct. 28, 1994, in the names of Neil Smith et al.

FIELD OF THE INVENTION

The present invention relates to a security device and system for encoding documents with code patterns, and particularly magnetic bar code patterns or other indicia exhibiting zero remanence.

DESCRIPTION OF THE BACKGROUND ART

In recent years, counterfeiting or falsification of documents including currency, checks, pre-paid tickets or debit cards, credit cards, ID cards, passports, security passes, licenses and the like, and their theft and misuse has proliferated. Security systems for incorporation into such documents involve the incorporation of encoded data, either visibly or invisibly or both, into or on the document substrate and a system for reading out the encoded data to authorize use of the document. In documents for general circulation or dispensation, e.g. currency, pre-paid tickets and the like, the document incorporates a security pattern e.g. a bar code pattern hidden from view. Other personalized documents, intended to be used only by an authorized user, incorporate visible user identification and limits of use data and other data stored magnetically. Cash cards, for example, include card visible data as well as identifying data stored in a magnetic stripe and require entry of a user selected personal identification number (PIN) to be compared to the PIN entered by the user before the card is accepted and the transaction requested is authorized.

To increase the security of such documents, from counterfeiting or unauthorized use, it has also been proposed to incorporate a magnetic stripe bar code or other pattern visible on or hidden within the document substrate that is read out by a magnetic head. Bar codes formed of magnetic ink have advantages over optical bar codes, first because the pattern can be hidden from view and second because the magnetic pattern does not deteriorate with wear of the document, which can lead to smearing of the optical bar code or pattern. Systems for reading visible magnetic bar code or other codes used on checks, can also be reliably operated at high rates of speed, which is important in such high volume operations as clearing checks.

In this regard, the magnetic materials employed in magnetic inks, e.g. $Fe_3O_4$, for use on banknotes, checks, and certain credit cards, typically have medium magnetic coercivity of 80–300 Oe. Magnetic materials for other credit cards, e.g. $BaFe_{12}O_{19}$ or $SrFe_{12}O_{19}$, have a high magnetic coercivity on the order of 3000 Oe. In both cases, the encoded magnetic pattern can be magnetized as the document is moved past a magnetic field, and then the magnetization pattern can be read out by an adjacent read head or spaced heads as shown, for example, in U.S. Pat. No. 4,863,196. The high remanence allows for the heads to be less sensitive. Conventional inductive heads can be used to both detect the magnetic pattern and read out the recorded code.

In a further U.S. Pat. No. 4,182,481, a series of spaced apart magnetoresistive (MR) sensor heads are employed in line with a permanent magnet for magnetizing the bar code bands before the magnetically polarized bar code bands are advanced past the MR sensor heads. The spacing of bands of the magnetic bar code pattern represents the code that is read out by the spaced apart MR heads.

It is recognized in the prior art that while the use of materials of high magnetic coercivity and remanence in magnetic bar code or authentication patterns hidden in the substrate is therefore advantageous, the persisting remanent magnetic field can be read out with comparable systems or the pattern duplicated by anhysterectic duplication. Considerable effort has been expended in schemes for blocking unauthorized duplication or decoding of the hidden bar code due to this possibility.

For additional security, it has been suggested to provide mixtures of high and relatively low coercivity magnetic materials in the same or in separate bar code bands of the bar codes and to provide more complex read heads. For example, the high coercivity bands or band materials may be magnetically polarized in different directions than the polarization of lower coercivity material bands. Such a security system is disclosed in the above-referenced '196 patent employing a plurality of read heads and a threshold comparison circuit for differentiating the bands.

In U.S. Pat. No. 4,982,076, it is also proposed that the bar code be formed with bar code bands of differing magnetic coercivity levels, as well as of a non-magnetic material as a "dummy" band that cannot be magnetized and read out magnetically. The medium and high coercivity materials are stated to be of the types listed above. The lowest coercivity materials include Fe powder, Sendust alloy powder, Mo-permalloy powder, Mn-Zn ferrite, Ni-Zn ferrite, Cu-Zn ferrite or the like.

The high coercivity bar code band is magnetized in a permanent magnetic state that is unaffected during read out. During magnetic reading of the bar code bands by a magnetic read head, the low, medium and high coercivity bar code bands are stated to be detectable, and as a result that the state of the high coercivity bar code band can be read out. Only the medium and high coercivity bands retain residual magnetization after read out that can be later detected by a magnetic viewer. Therefore, the actual code is at least partly undecipherable, since an attempt to magnetically view the bar code pattern will result in an inaccurate reproduction of only the high and medium bar code bands of the bar code pattern.

Problems to be Solved by the Invention

There remains a need for a security pattern, e.g. a magnetic bar code, that is not visible to the eye or readily viewed by a magnetic viewer for use with currency, credit and debit cards, stock certificates and bonds, and other such documents susceptible to counterfeiting or illegal use and a system for reading such a pattern in verifying authenticity or authorized use.

SUMMARY OF THE INVENTION

It is therefore an object of the present invention to provide such a magnetic code pattern and system for reading the code pattern that is not visible to the eye or a magnetic viewer.

In accordance with the invention, it is realized that low concentrations of magnetic materials having essentially zero remanence may be employed to provide a code pattern or indicia on or in a document or card that can be read out with a specialized read head for verification purposes. The code pattern is preferably a bar code that is uniquely coded to identify the specific document as an individual document or a document type or an authorized user of the document.

More specifically, in one aspect of the invention, a read-only magnetic security device formed on or in a document for authenticating the document comprises a document substrate, and an intermittent code pattern of spaced apart indicia of magnetic material formed on or in the document substrate signifying an authenticating security pattern, the magnetic material of all indicia having a coercivity and a remanence approaching zero thereby rendering the magnetic material incapable of retaining a discernible magnetization in the absence of an applied magnetic field.

The read-only magnetic security device is preferably employed in a system for reading the intermittent code pattern formed on or in a document for authenticating the document comprising a magnetic in-field sensor head including a magnetoresistive read head having a thin film sensor for reading a moment of the magnetic material when magnetized by an applied magnetic field and providing a corresponding output signal together with means for applying an external magnetic field in the region of the sensor for magnetizing the magnetic material, and means for effecting relative movement of the magnetic in-field sensor head and the document to successively move the spaced apart areas of the intermittent pattern past the external field and sensor to derive an output signal pattern reflecting the intermittent code pattern.

The intermittent code pattern is preferably either a one-dimensional pattern of lines where the code pattern is detectable with a single in-field MR head or a two-dimensional pattern where a plurality of in-field MR heads are required to detect the code pattern (or the document and single in-field MR head are shifted relatively to one another to effect multiple scanning passes).

The intermittent code pattern referred to herein may not necessarily reflect a decipherable code but simply a pattern or indicia or the like. The pattern or indicia may be randomly placed over or within all or a part of a document as defined herein, and the in-field sensor heads may be arranged to verify the presence of the intermittent pattern anywhere therein or in the proper part thereof.

Advantageous Effects of the Invention

The encoding device and system of the present invention prevents the code pattern from being viewed magnetically and decoded. The pattern is invisible to all magnetic read heads except the in-field MR head.

BRIEF DESCRIPTION OF THE DRAWINGS

These and other objects, advantages and features of the invention will be become apparent from the detailed description given hereinafter in relation to the accompanying drawings, in which.

DETAILED DESCRIPTION OF THE PREFERRED EMBODIMENTS

The magnetic inks and materials described above have been characterized in terms of coercivity $H_c$, that is the magnetic field that must be applied to reduce the saturation remanence $H_r$ in a magnetic material to zero. These high, medium and low coercivity materials generally also exhibit levels of remanence after removal of the magnetizing field that are characterized as high, medium and low, respectively. Certain of materials characterized as low coercivity materials also exhibit little or no remanence. These materials are selected for use in the present invention, because they are invisible due to their low signal strength to conventional magnetic read heads and to magnetic viewers.

Figure 1:
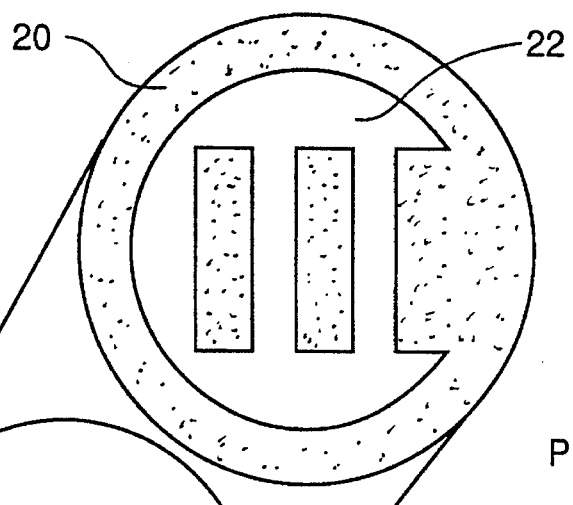
FIG. 1 is a schematic view of one example of a high remanence magnetic ink, one-dimensional bar code pattern viewed by a magnetic viewer.

Referring to FIG. 1, it depicts a low, medium or high remanence magnetic ink bar code pattern 10 (or any other intermittent coded or uncoded indicia employed for document security) on a document substrate 12 as viewed by a magnetic viewer 20 in accordance with the prior art. The magnetic viewer 20 is capable of detecting the remanent magnetic field left in the magnetic ink bar code pattern 10 because of the residual field retained after any preceding operation where the bar code pattern 10 was subjected to a magnetic field. The viewed pattern 22 is visible to the magnetic viewer 20 because high, medium and low coercivity materials of the type described above typically exhibit a sufficient remanence to previously applied fields. Such a degree of remanence also makes it possible to read or detect the bar code pattern 10 with a conventional inductive or MR read head and related read head types. As shown, the "1" and "0" patterns evidenced by bar code bands 28 and 30, respectively, are visible.

Figure 2:
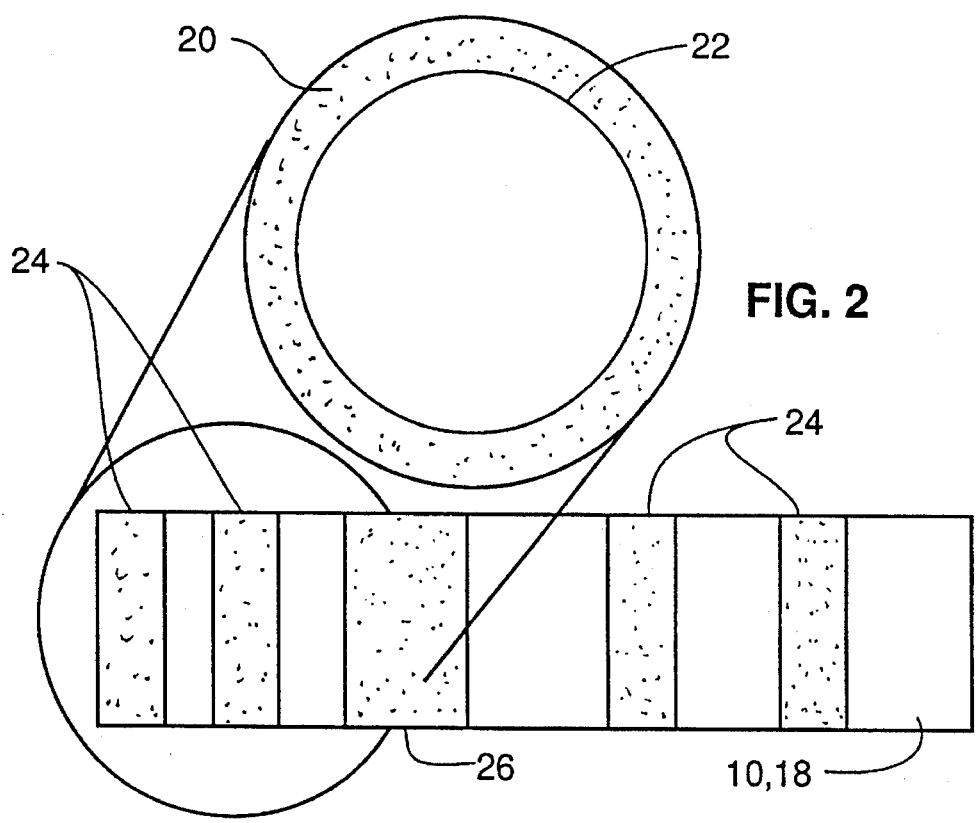
FIG. 2 is a schematic view of an example of a zero remanence magnetic ink, one dimensional bar code pattern incapable of being viewed by a magnetic viewer.

A bar code pattern 10 of a low concentration magnetic ink exhibiting very low to zero remanence is depicted in FIG. 2. Such a pattern 10 is incapable of being viewed by the magnetic viewer 20, since no remanent magnetic field persists after a prior exposure to a magnetic field. Such magnetic inks may be formulated from "soft" magnetic or magnetizable materials including Fe powder, ferrites, Sendust powder, amorphous alloys in a powder form (CoFe(X)), CoX (where X=B, Si, Zr, Ti), FeXGaSi type alloys (where X=Ru, Rh, Co), and Mo-NiFe alloys. A concentration of these materials in an ink or binder medium of <10% by volume is preferred. The material preferably exhibits a remanence between 0–5 G and a coercivity between 0–1 Oe. The squareness ratio of remanence to saturation magnetization is also preferably less than 5% in these preferred materials and concentrations.

Figure 3:
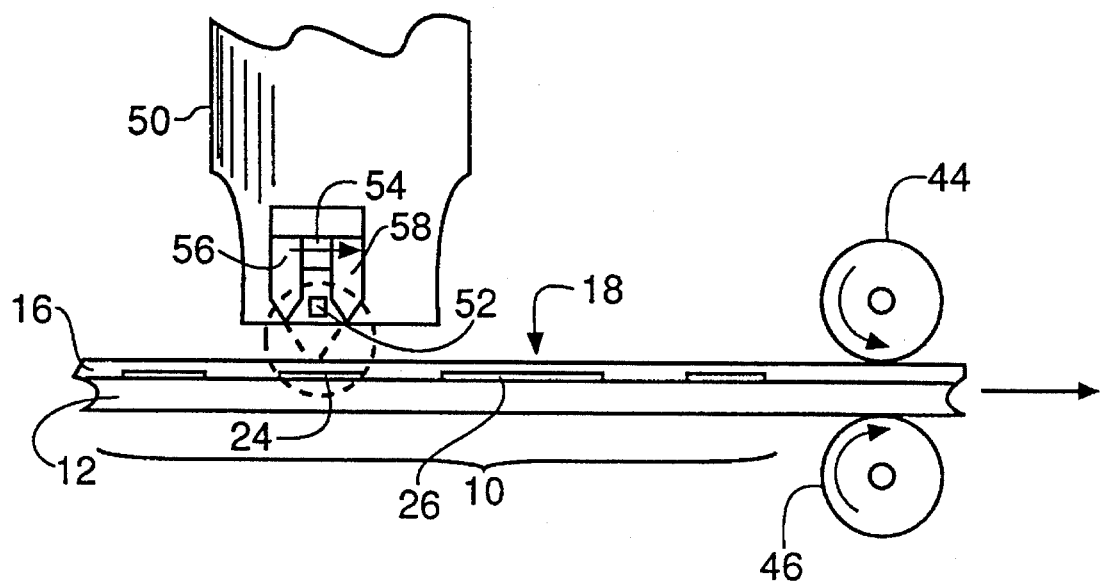
FIG. 3 is a diagrammatic view of a read only, magnetic security system employing the zero remanence bar code pattern in accordance with the present invention.

Referring to FIG. 3, a magnetic detector 50 is depicted in relation to the magnetic bar code pattern 10 deposited on document substrate 12 and within an obscuring layer 16 of document 18 that hides the pattern 10 from view. The obscuring layer 16 may comprise an ink layer of the same color, a tape, laminate, surface paper layer or the like. The system of the present invention may also be used with a fully visible magnetic bar code pattern 10 on the surface of document 18. However it is placed on or in the document 18, the read only magnetic security device for the document 18 comprises the intermittent code pattern of the nearly zero remanence magnetic material constituting all or part of the bar code pattern 10.

The magnetic detector 50 or the document 18 are moved relative to one another by moving means comprising the motor driven rollers 44 and 46 so that the widths of individual bar code bands 24, 26 of the bar code pattern 10 move past the magnetic detector 50. As the movement occurs, the bar code bands 24, 26 move through the magnetic field of the magnetic detector and are briefly magnetized. The brief magnetization affects a current signal of the MR sensor to develop a resistance change of a temporal length dependent on the width of bands 24, 26.

The magnetic detector 50 includes a permanent magnet 54 extending between a pair of soft magnetic material yokes 56 and 58 for producing a saturation magnetic field 40 (extending into the band 24 as depicted in FIG. 3). An MR sensor 52 is positioned in the gap of yokes 56 and 58 for detecting the saturation moment induced in each magnetic bar code band 24, 26 by the saturation magnetic field 40.

The sensing principle of MR sensor 52 is that of magnetoresistance. A thin film of 81/19 NiFe, for example, is located in the gap between the yokes 56 and 58 so that the plane of the film is perpendicular to the large magnetic field. Because the plane of the film is perpendicular to the large field, this field is not detected, and the MR sensor 52 can respond to the very small magnetic field emanating from the bands 24, 26 of bar code pattern 10 with excellent signal-to-noise ratio.

Figure 4:
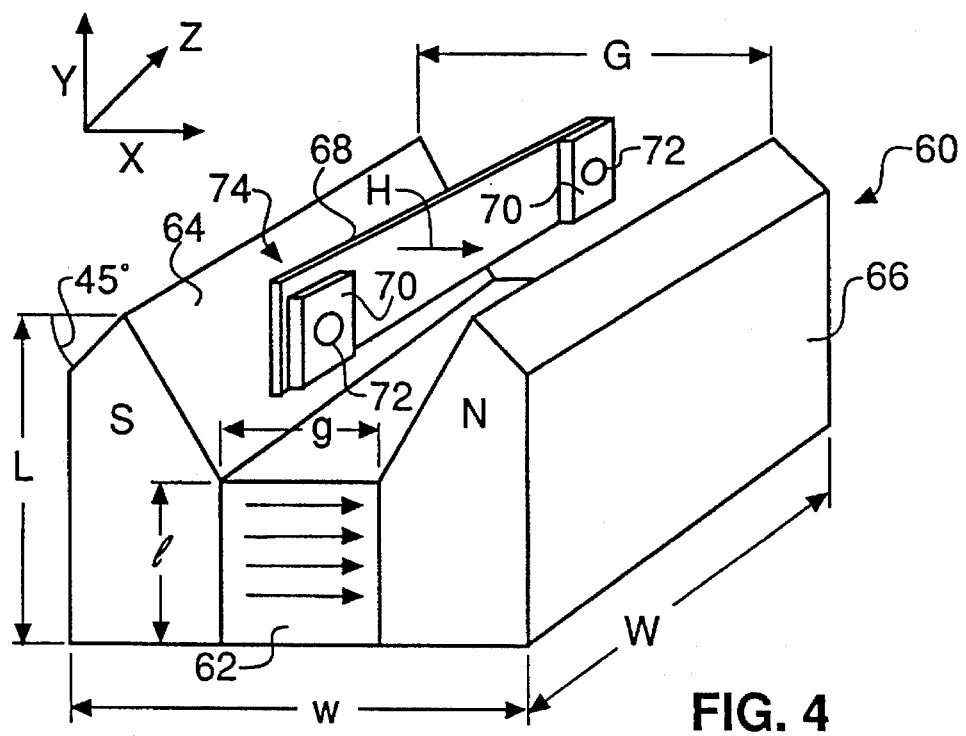
FIG. 4 is a diagrammatic perspective view of an in-field magnetoresistive (MR) magnetic read head employed in the system of FIG. 3.

A preferred embodiment of the magnetic assembly according to the present invention is shown in FIG. 4. As shown, magnetic head assembly 60 includes a permanent magnet 62, magnetically soft, high permeability pole pieces 64, 66 and MR sensing element 68 located at or near the center of first gap G between pole pieces 64, 66. MR sensing element 68 has conductive pads 70 and conductors 72 for carrying an electrical sensing current through sensing element 68.

The size of the first gap, G, is chosen such that the gap field, $H_G$, (along the x-direction) is sufficiently large, and the gradient $\delta H_x/\delta Y$, is sufficiently small, in order to substantially or fully magnetically saturate the magnetic component of the pigment (ink) of the bar code pattern 10 of the document 18 being read, over the full mechanical tolerance of the head-to-document spacing of the mechanical transport which moves the document past the MR sensing element 68 located at or near the center of the upper pole piece gap G. The second gap, g, at the site of the permanent magnet (PM) 62, and equal to the thickness of the PM 62, is chosen so that the PM 62 will provide sufficient magnetomotive force to achieve sufficient magnitude of the gap field, $H_G$. Along with the PM 62 height, l, the specific size of the gap g may be optimized to operate the PM 62 material at its most efficient $(B-H)_{max}$ operating point, or to accommodate manufacturer's stock thickness of the PM 62 material in order to reduce the cost of PM 62 and/or mechanical assembly.

The total height, L, is chosen sufficiently large to remove the PM 62 away from the first gap G such that the field gradients at or above the first gap G (where the MR element 68 and document are located) are determined primarily by the pole piece 64, 66 geometry, and not significantly influenced directly by stray fields from the PM 62 itself. The sizes of G, g, l, and L are also chosen sufficiently large so that the MR sensing element 68 can be made to fit inside the volume of the pole pieces 64, 66 gap region. Given the large gradients, $\Delta\delta H_y/\delta x$, of the transverse field, $H_y$, at the site of the MR element 68 allows maintenance of the MR element 68 in a proper bias magnetization state. The field, $H_y$, may additionally be exploited for use in providing the proper bias field for the given design MR element 68.

The width, w, of the pole piece 66, 64 is chosen to be as small as is mechanically convenient, while maintaining sufficiently low pole piece 66, 64 reluctance for good efficiency, and avoidance of pole piece 66, 64 saturation near the base of the pole pieces 66, 64 adjacent to the PM 62. The track width, W, is chosen with regard to the width of that portion of the document that is being magnetically detected. The approximately 45° taper at the outer corner of the pole pieces 64, 66 significantly reduces the reverse field seen by a document either before or after passing over the MR element 68.

A specific design of magnetic assembly includes annealed, cold-rolled steel pole pieces 64, 66, with a NdFeB permanent magnet 62 (remanence $B_r$=11 kG, coercivity $H_c$=15 KOe, and an essentially square M—H loop) with G=0.3 inches, g=0.125 inches (NdFeB manufacturer's stock thickness), L=0.9 inches, l=0.185 inches, w=0.6 inches, and W=3.0 inches. This design provides a gap field of $H_G$=1200 Oe and a document field≧800 Oe for≦0.08 inch head-to-document spacing.

As described above with respect to FIG. 2, the low to zero remanence magnetic material of the bar code bands 24, 26 does not exhibit any residual magnetization after exposure to the permanent magnetic field of the in-field magnetic detector 50 of FIGS. 3 and 4. Therefore, even after detection of the bar code pattern 10, it is not visible to a magnetic viewer. Moreover, the code pattern 10 is not readable by conventional inductive heads and MR heads of other types. This increases security of the document and inhibits its alteration, counterfeiting or mis-use.

Figure 5:
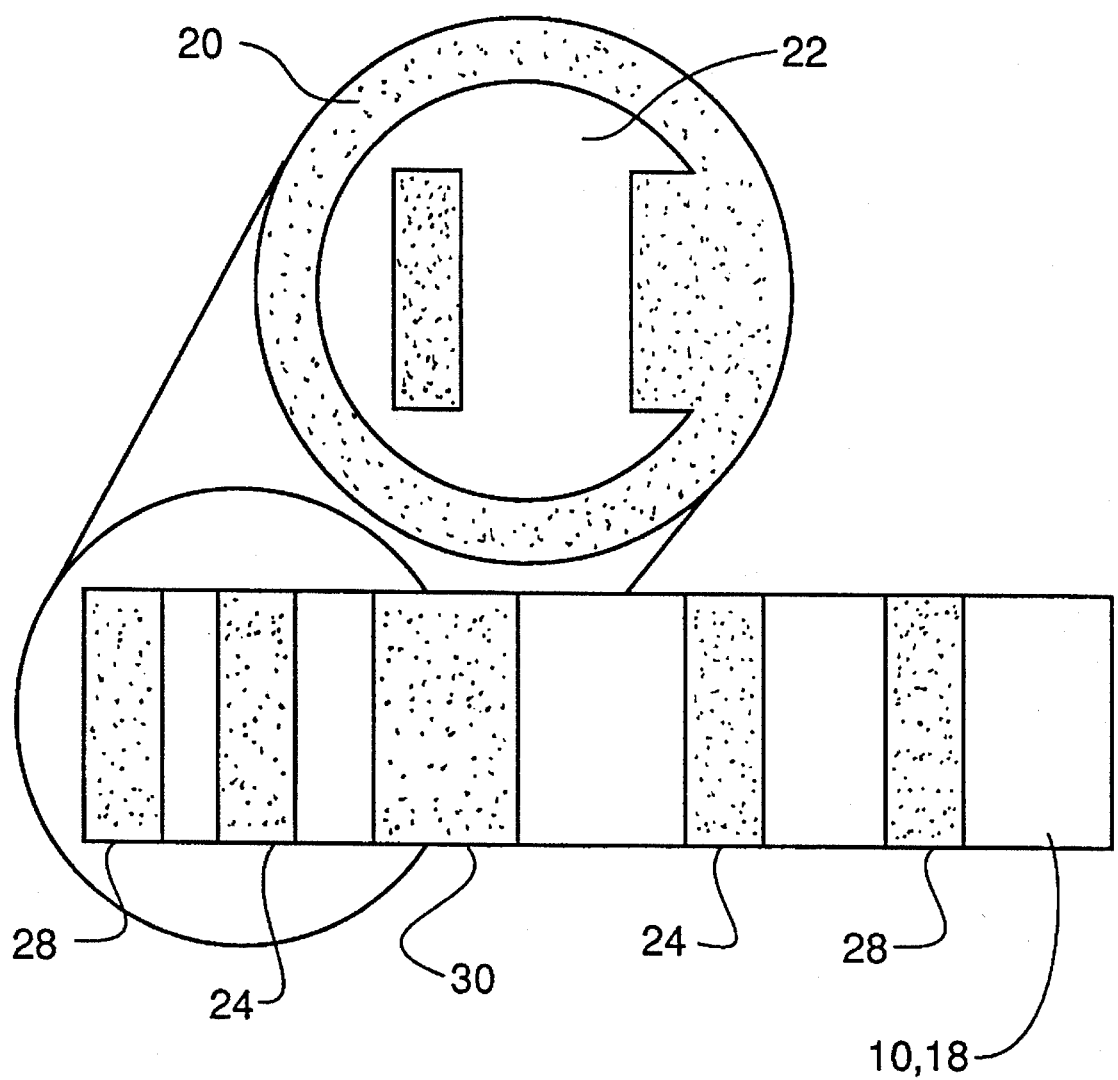
FIG. 5 is a schematic view of an example of a zero remanence, magnetic ink, one-dimensional bar code pattern incapable of being viewed by a magnetic viewer embedded within a higher remanence magnetic ink bar code pattern capable of being viewed by a magnetic viewer.

In a further aspect of the invention, it is contemplated that the security device of the present invention may be employed embedded within a bar code pattern that is visible to the magnetic viewer 20. FIG. 5 is a further schematic view of such a bar code pattern 10 wherein certain of the bar code bands 24, 26 between bands 28, 30 are not visible to the magnetic viewer 20, which can see the bands 28. In other words, bands 28 and 30 are formed of higher remanence magnetic ink that is visible to the viewer 20 and readable by conventional inductive and MR read heads. An attempt to view or read out the bar code pattern 10 of FIG. 5 would result in an incomplete pattern of only 28 and 30 width bands which, when duplicated or attempted to be used would not satisfy comparison to the legitimate pattern. In this regard, all of the bar code bands 24, 26, 28, 30 are readable by the in-field MR head 52 of FIGS. 3 and 4, and therefore, legitimate coded documents can be read out with the single magnetic read head.

The intermittent code pattern of indicia to be detected in accordance with the present invention may constitute any of the known configurations, including width and spacing modulation of bar codes, and may either be visible or masked to the eye. For greatest security, of course, the intermittent code pattern is preferably hidden from view. The indicia may include patterns or symbols of other types, e.g. official seals, "water marks" or the like.

In this regard, the indicia of the intermittent code pattern may not necessarily reflect a code. The indicia may be randomly placed over or within the entire surface or a part or parts of the surface of the document, and the document verified by the presence of the indicia anywhere in it or in the proper part or parts thereof. In this sense, the intermittent code pattern may comprise spaced apart patches of indicia of the low remanence material. The indicia may constitute a continuous coating of the magnetic material.

Where the intermittent code pattern or indicia constitutes a one-dimensional bar code, a single row of spaced apart magnetic ink stripes or bars of the materials described above are employed, and a single in-field MR head will suffice to decode the encoded data. In certain one-dimension bar codes, the data of the code is manifested by parallel stripes of differing widths representing ones and zeros. In other bar codes, the pattern is referenced to a reference starting point, and the presence or absence of a magnetic stripe at distances stepped off from the starting point signifies a one or zero bit, respectively, (or the converse). In certain other one-dimensional bar codes, the spacing between bar code stripes of uniform width defines the data bit, and it may be necessary to use two or more spaced magnetic detectors 50 of the type described above.

In two-dimensional bar code patterns, a plurality of associated rows of stripes of magnetic ink or material of the type described above are laid down in relation to one another. Either a like plurality of in-field MR heads in a head array are required to simultaneously detect the code pattern of each row or the document and a single in-field MR head are shifted relatively to one another to effect multiple scanning passes to detect the row patterns sequentially.

The present invention may be readily implemented in either case, and regardless of the bar code pattern of the code. Moreover, multiple, spaced apart, magnetic detectors 50 may be employed for verification of uncoded patterns or patches of indicia in more than one part of the document by simultaneous or sequential detection of the code pattern.

In each of these embodiments, the document or the magnetic detector(s) may be moved relative to one another. For example, a credit card or currency may be verified by manual or machine advancement past one or more fixed magnetic detector(s). In another example, the magnetic detector(s) may be fitted into a wand and moved manually or automatically over a fixed document.

Documents in which the present invention may be practiced include a credit card, debit card, personal ID or security card, driver's license, passport, currency, stock certificate, bond, check, or any other document subject to counterfeiting, altering, or unauthorized misuse.

The invention has been described in detail herein with reference to the figures, however, it will be appreciated that variations and modifications are possible within the spirit and scope of the invention.

PARTS LIST FOR FIGS. 1–5 bar code pattern 10
document 12
obscuring layer 16
document 18
magnetic viewer 20
viewed pattern 22
bar code bands 24, 26, 28, 30
saturation magnetic field 40
motor driven rollers 44 and 46
magnetic detector 50
MR sensor 52
permanent magnet 54
soft magnetic material yokes 56, 58
magnetic head assembly 60
permanent magnet PM 62
magnetically soft, high permeability pole pieces 64, 66
MR sensing element 68
conductive pads 70
conductors 72

I claim:

1. A read-only magnetic security device formed on or in a document for authenticating the document comprising:

a document substrate; and an intermittent pattern of spaced apart indicia of magnetic material formed on or in the document substrate signifying an authenticating security pattern, the magnetic material of all indicia having a remanence approaching zero thereby rendering the magnetic material capable of being magnetized in the presence of an applied magnetic field to exhibit a magnetic moment but incapable of retaining a discernible magnetization in the absence of an applied magnetic field.

2. The security device of claim 1 wherein said magnetic material exhibits a squareness ratio of remanence to saturation magnetization of less than 5%.

3. The security device of claim 1 wherein said magnetic material has a coercivity in the range of 0 to 1 Oe and a remanence in the range of 0 to 5 G.

4. The security device of claim 3 wherein said intermittent security pattern is in the form of a visible bar code pattern, and said indicia constitute at least one or more of the visible bar code bands.

5. The security device of claim 3 wherein said intermittent security pattern is in the form of an invisible bar code pattern, and said indicia constitute at least one or more of the invisible bar code bands.

6. The security device of claim 3 wherein said intermittent security pattern is in the form of an invisible bar code pattern embedded within a visible bar code, and said indicia constitute invisible bar code bands.

7. The security device of claim 3 wherein said intermittent security pattern is in the form of an invisible, random distribution of said indicia with respect to said document.

8. The security device of claim 3 wherein said intermittent security pattern is in the form of an invisible, random distribution of said indicia with respect to at least one predetermined part of said document.

9. The security device of claim 3 wherein said magnetic material is deposited on said document substrate as an ink formed of particulate mixed with a binder and a dye solution, the particulate having a concentration of less than 10% by volume in the mixture.

10. The security device of claim 1 wherein said intermittent security pattern is in the form of a visible bar code pattern, and said indicia constitute at least one or more of the visible bar code bands.

11. The security device of claim 1 wherein said intermittent security pattern is in the form of an invisible bar code pattern, and said indicia constitute at least one or more of the invisible bar code bands.

12. The security device of claim 1 wherein said intermittent security pattern is in the form of an invisible bar code pattern embedded within a visible bar code, and said indicia constitute invisible bar code bands.

13. The security device of claim 1 wherein said intermittent security pattern is in the form of an invisible, random distribution of said indicia with respect to said document.

14. The security device of claim 1 wherein said intermittent security pattern is in the form of an invisible, random distribution of said indicia with respect to at least one predetermined part of said document.

15. The security device of claim 1 wherein said magnetic material is deposited on said document substrate as an ink formed of particulate mixed with a binder and a dye solution, the particulate having a concentration of less than 10% by volume in the mixture.

16. A read-only magnetic security system for reading an encoded security pattern formed on or in a document for authenticating the document comprising:

a document including a document substrate and an intermittent security pattern of spaced apart indicia of magnetic material formed on or in the document substrate signifying an authenticating security pattern, the magnetic material having a remanence approaching zero thereby rendering the magnetic material capable of being magnetized in the presence of an applied magnetic field to exhibit a magnetic moment but incapable of retaining a discernible remanent magnetic moment when the applied magnetic field is removed;

a magnetic in-field sensor head including a magnetoresistive read head having a sensor gap for reading a remanence moment of Said magnetic material when magnetized by an applied magnetic field and providing a corresponding output signal and means for applying an external magnetic field in the region of said sensor gap for magnetizing said magnetic material; and means for effecting relative movement of said magnetic in-field sensor head and said document to successively move said spaced apart areas of said intermittent pattern past said external field and sensor gap to derive an output signal pattern reflecting said security pattern.

17. The security system of claim 16 wherein said magnetic material has a coercivity in the range of 0 to 1 Oe and a remanence in the range of 0 to 1 G.

18. The security device of claim 16 wherein said magnetic material exhibits a squareness ratio of remanence to saturation magnetization of less than 5%.

19. The security system of claim 16 wherein said intermittent security pattern is in the form of a visible bar code pattern, and said indicia constitute at least one or more of the visible bar code bands.

20. The security system of claim 16 wherein said intermittent security pattern is in the form of an invisible bar code pattern, and said indicia constitute at least one or more of the invisible bar code bands.

21. The security system of claim 16 wherein said intermittent security pattern is in the form of an invisible bar code pattern embedded within a visible bar code, and said indicia constitute invisible bar code bands.

22. The security system of claim 16 wherein said intermittent security pattern is in the form of an invisible, random distribution of said indicia with respect to said document.

23. The security system of claim 16 wherein said intermittent security pattern is in the form of an invisible, random distribution of said indicia with respect to at least one predetermined part of said document.

24. The security system of claim 16 wherein said magnetic material is an ink formed of particulate mixed with a binder and a dye solution, the particulate having a concentration of less than 10% by volume in the mixture.

* * * * *